United States Patent
Bora et al.

(10) Patent No.: US 8,990,453 B1
(45) Date of Patent: Mar. 24, 2015

(54) ADAPTIVE AND OPTIMIZED FLOW CONTROL MECHANISM

(71) Applicants: Bhaskar Bora, Karnataka (IN); Mark J. Halstead, Holliston, MA (US); Benoit J. Merlet, Chelmsford, MA (US); Dharmesh Thakkar, Northborough, MA (US)

(72) Inventors: Bhaskar Bora, Karnataka (IN); Mark J. Halstead, Holliston, MA (US); Benoit J. Merlet, Chelmsford, MA (US); Dharmesh Thakkar, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 164 days.

(21) Appl. No.: 13/715,222

(22) Filed: Dec. 14, 2012

(51) Int. Cl.
*G06F 3/00* (2006.01)
*G06F 3/06* (2006.01)

(52) U.S. Cl.
CPC .............. *G06F 3/061* (2013.01); *G06F 3/0629* (2013.01); *G06F 3/0683* (2013.01)
USPC ................................................ 710/29; 710/5

(58) Field of Classification Search
None
See application file for complete search history.

(56) References Cited

U.S. PATENT DOCUMENTS

| 5,544,347 | A | 8/1996 | Yanai et al. |
| 5,742,792 | A | 4/1998 | Yanai et al. |
| 6,968,369 | B2 | 11/2005 | Veprinsky et al. |
| 8,533,374 | B1 * | 9/2013 | Gipp et al. ............... 710/60 |
| 2010/0153612 | A1 * | 6/2010 | Zwisler et al. ............. 710/313 |
| 2010/0191876 | A1 * | 7/2010 | Muppirala et al. ............ 710/39 |

OTHER PUBLICATIONS

Bora, Bhaskar, et al., U.S. Appl. No. 13/161,587 for "Adaptive Flow Control for Networked Storage", filed Jun. 16, 2011.

* cited by examiner

*Primary Examiner* — Idriss N Alrobaye
*Assistant Examiner* — Richard B Franklin
(74) *Attorney, Agent, or Firm* — Muirhead and Saturnelli, LLC

(57) ABSTRACT

Described are techniques for controlling a flow of I/O requests. R is received denoting a current maximum number of outstanding I/O requests allowed to be issued by a first data storage system to a second data storage system over a path. Assessment processing is performed to obtain a first performance value, a second performance value, and a third performance value, respectively, when the maximum number of outstanding I/O requests allowed to be issued by the first data storage system to the second data storage system over the path is R+delta1, R, and R−delta2 (delta1 and delta 2 are positive integer values). It is determined whether to update R in accordance with criteria including the first performance value, the second performance value and the third performance value.

19 Claims, 8 Drawing Sheets

ADAPTIVE AND OPTIMIZED FLOW CONTROL MECHANISM

BACKGROUND

1. Technical Field

This application generally relates to data storage and more particularly to techniques used in connection with controlling the flow of data operations between data storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data storage systems, hosts and other components may be interconnected by one or more communication connections such as in a network configuration. The network may support transmissions in accordance with well-known protocols such as TCP/IP (Transmission Control Protocol/Internet Protocol), UDP (User Datagram Protocol), and the like. Networked storage systems, such as data storage arrays, may be used to maintain data on different systems in different locations. Such mirroring may be used for a variety of reasons including reducing the likelihood of data loss. For example, in some implementations, a primary or source data site, such as a first or primary data storage system, may be configured in a partner relationship with a second or remote data storage system whereby the second data storage system includes a mirror or copy of data of one or more devices of the first data storage system.

SUMMARY OF THE INVENTION

In accordance with one aspect of the invention is a method of controlling a flow of I/O requests comprising: receiving R denoting a current maximum number of outstanding I/O requests allowed to be issued by a first data storage system to a second data storage system over a path; performing assessment processing, said assessment processing including: determining a first performance value observed when a maximum number of outstanding I/O requests allowed to be issued by the first data storage system to the second data storage system over the path is R+delta1, wherein delta1 is a positive integer value; determining a second performance value observed when a maximum number of outstanding I/O requests allowed to be issued by the first data storage system to the second data storage system over the path is R; and determining a third performance value when a maximum number of outstanding I/O requests allowed to be issued by the first data storage system to the second data storage system over the path is R−delta2, wherein delta2 is a positive integer value; and determining whether to update R in accordance with criteria including the first performance value, the second performance value and the third performance value. Determining whether to update R may include determining whether the first performance value is greater than both the second and third performance values. If the first performance value is greater than both the second and third performance values, an updated value for R may be determined as R+delta1. The assessment processing may be repeated using the updated value for R. Determining whether to update R may include determining whether the second performance value is greater than both the first and third performance values. If the second performance value is greater than both the first and third performance values, R may not be updated. If the second performance value is greater than both the first and third performance values, R may not be updated a first percentage of time and wherein for a second percentage of time, an updated value for R is determined as R−delta2. The first percentage of time may be 70% and the second percentage of time may be 30%. If the first performance value is not greater than both the second and third performance values, and wherein if the second performance value is not greater than both the first and third performance values, an updated value for R may be determined as R−delta2. The assessment processing may be repeated using the updated value for R. The assessment processing may be performed for an assessment period including three trial periods. A first of the three trial periods may be performed to determine the first performance value. A second of the three trial periods may be performed to determine the second performance value. A third of the three trial periods may be performed to determine the third performance value. An order in which the three trial periods are performed may be randomly determined. A time period indicating an amount of lapsed time for each of the three trial periods may be determined in accordance with a maximum response time representing an aggregated maximum amount of time expected for transmitting an I/O request from the first data storage system to the second data storage system, for performing the I/O request by the second data storage system, and for the first data storage system to receive an acknowledgment regarding completion of the I/O request. Allowable values for delta1 may be included a first predetermined range of values and allowable values for delta2 may be included a second predetermined range of values. The first predetermined range and the second predetermined range may each represent a same range of integer values. The assessment processing may be performed a plurality of iterations, wherein a value for R used in one of the plurality of iterations may be determined from another of the plurality of iterations performed immediately prior to the one iteration. A network optimizer may be included on the path. The network optimizer may perform one or more optimizations on messages sent over the path. Any of the time period for each of the trial periods, the criteria used in determining whether to update R, allowable values for delta1, and allowable values for delta1 may be adjusted in response to the network optimizer being included on the path. When the network optimizer is included on the path, the time period for each of the three trial periods may be increased from a first amount of time to a second amount of time where the first amount of time may be an amount of time of the time period when no network optimizer is present on the path.

In accordance with another aspect of the invention is a system comprising: a first data storage system and a second data storage system, wherein a plurality of paths are used in connection with issuing I/O requests from the first data storage system to the second data storage system; a first plurality of remote adapters of the first data storage system; a second plurality of remote adapters of the second data storage system, each of the plurality of paths including an initiator port of one of the first plurality of remote adapters of the first data storage system issuing one of the I/O requests to a target port of one of the second plurality of remote adapters of the second data storage system; and wherein each of the first plurality of remote adapters of the first data storage system comprises code stored on a computer readable medium which, when executed by a processor, performs processing comprising: receiving R denoting a current maximum number of outstanding I/O requests allowed to be issued by the first data storage system to the second data storage system over one of the plurality of paths including said each remote adapter; performing assessment processing, said assessment processing including: determining a first performance value observed when a maximum number of outstanding I/O requests allowed to be issued by the first data storage system to the second data storage system over the one path is R+delta1, wherein delta1 is a positive integer value; determining a second performance value observed when a maximum number of outstanding I/O requests allowed to be issued by the first data storage system to the second data storage system over the one path is R; and determining a third performance value when a maximum number of outstanding I/O requests allowed to be issued by the first data storage system to the second data storage system over the one path is R−delta2, wherein delta2 is a positive integer value; and determining whether to update R in accordance with criteria including the first performance value, the second performance value and the third performance value.

In accordance with another aspect of the invention is a computer readable medium comprising code stored thereon for controlling a flow of I/O requests, the computer readable medium comprising code stored thereon for: receiving R denoting a current maximum number of outstanding I/O requests allowed to be issued by a first data storage system to a second data storage system over a path; performing assessment processing, said assessment processing including: determining a first performance value observed when a maximum number of outstanding I/O requests allowed to be issued by the first data storage system to the second data storage system over the path is R+delta1, wherein delta1 is a positive integer value; determining a second performance value observed when a maximum number of outstanding I/O requests allowed to be issued by the first data storage system to the second data storage system over the path is R; and determining a third performance value when a maximum number of outstanding I/O requests allowed to be issued by the first data storage system to the second data storage system over the path is R−delta2, wherein delta2 is a positive integer value; and determining whether to update R in accordance with criteria including the first performance value, the second performance value and the third performance value.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
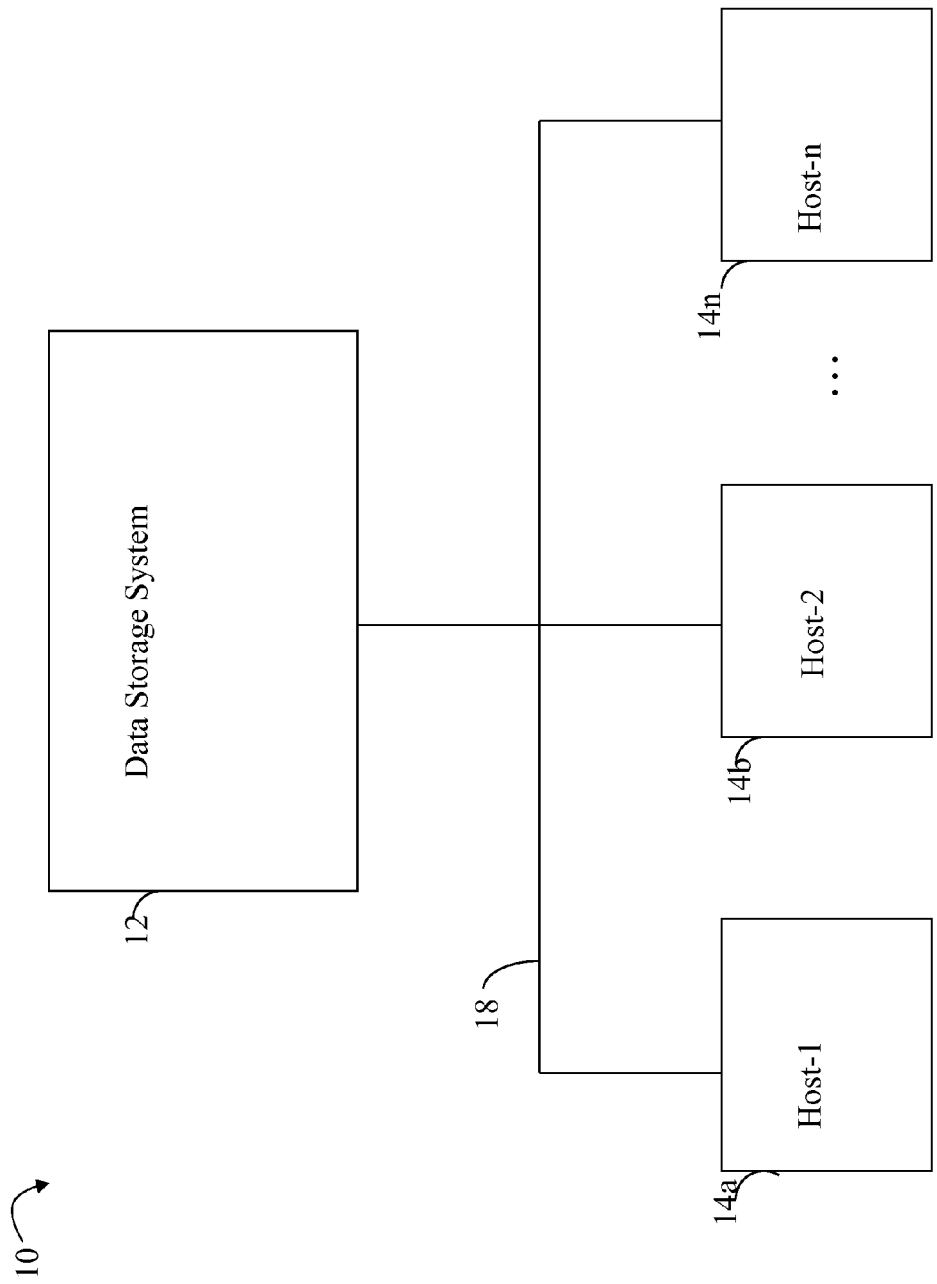
FIG. 1 is an example of an embodiment of a computer system that may utilize the techniques described herein.

Referring now to FIG. 1, shown is an example of an embodiment of a system that may be used in performing the techniques described herein. The system 10 includes a data storage system 12 connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, ESCON, Fibre Channel, iSCSI, or GIGE (Gigabit Ethernet), and the like. Some or all of the connections by which the hosts and data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
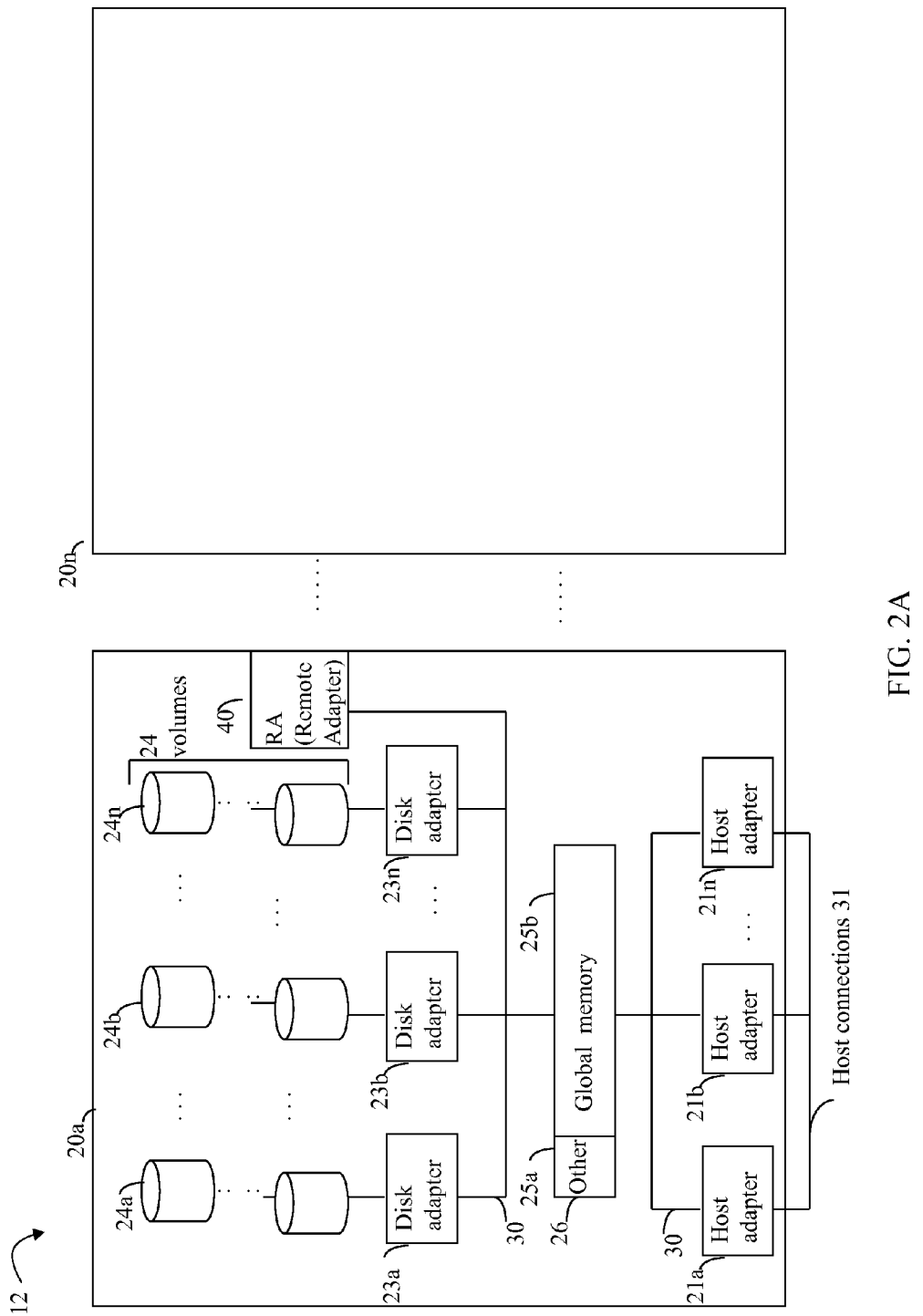
FIG. 2A is an example of an embodiment of a data storage system.

Referring now to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems.

Each of the data storage systems, such as 20a, may include a plurality of data storage devices, such as disk devices or volumes, in an exemplary arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

Also shown in the storage system 20a is an RA or remote adapter 40. The RA may be hardware including a processor used to facilitate communication between data storage systems, such as between two of the same or different types of data storage systems. In one embodiment described in more detail in following paragraphs and figures, the RAs of the different data storage systems may communicate over a Gigabit Ethernet or Fibre Channel transmission channel supporting messaging traffic between data storage systems. The RA may be hardware including a processor used to facilitate communication between data storage systems, such as between two Symmetrix® data storage systems. The RA may be used with the Symmetrix Remote Data Facility (SRDF®) products provided by EMC Corporation of Hopkinton, Mass. SRDF® is a family of products that facilitates the data replication from one Symmetrix® storage array to another through a Storage Area Network (SAN) or and IP network. SRDF® logically pairs a device or a group of devices from each array and replicates data from one to the other synchronously or asynchronously. Generally, the SRDF® products are one example of commercially available products that may be used to provide functionality of a remote data facility (RDF) for use in an embodiment in connection with techniques herein.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a rotating disk or solid state storage device (e.g., a flash-based storage device), should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on an LV may be accessed by the DA following a data request in connection with I/O operations that other directors originate.

Figure 2B:
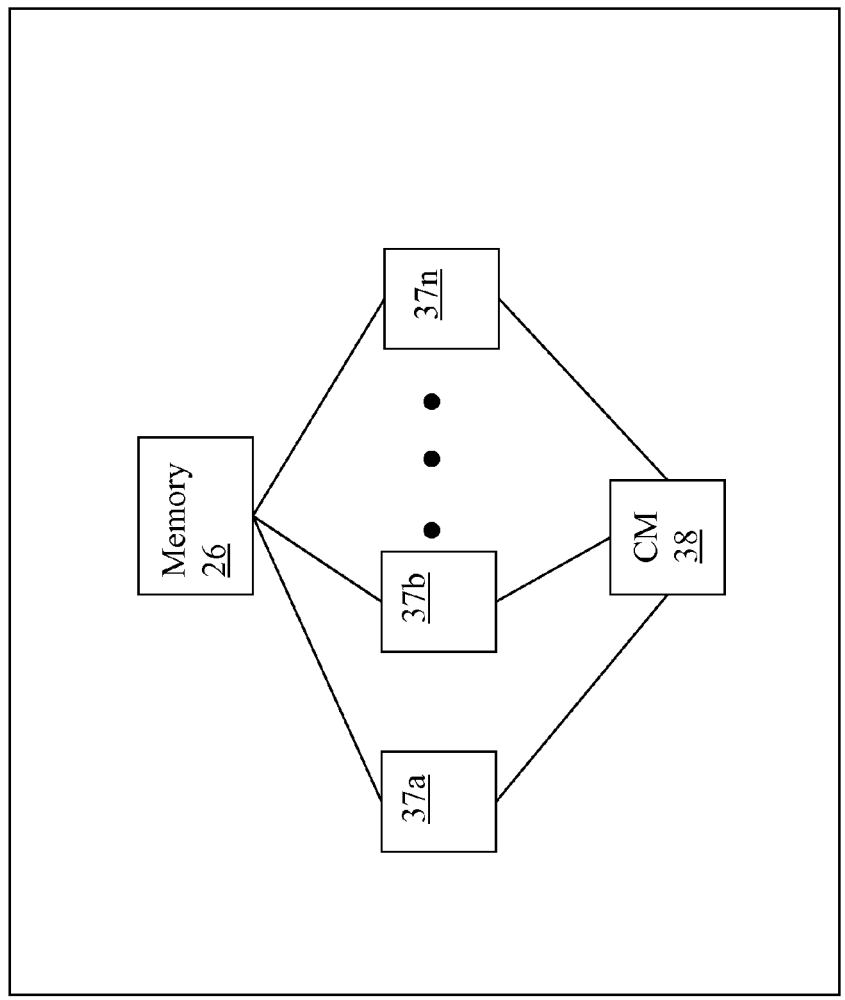
FIG. 2B is a representation of the logical internal communications between the directors and memory included in one embodiment of the data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

Figure 3:
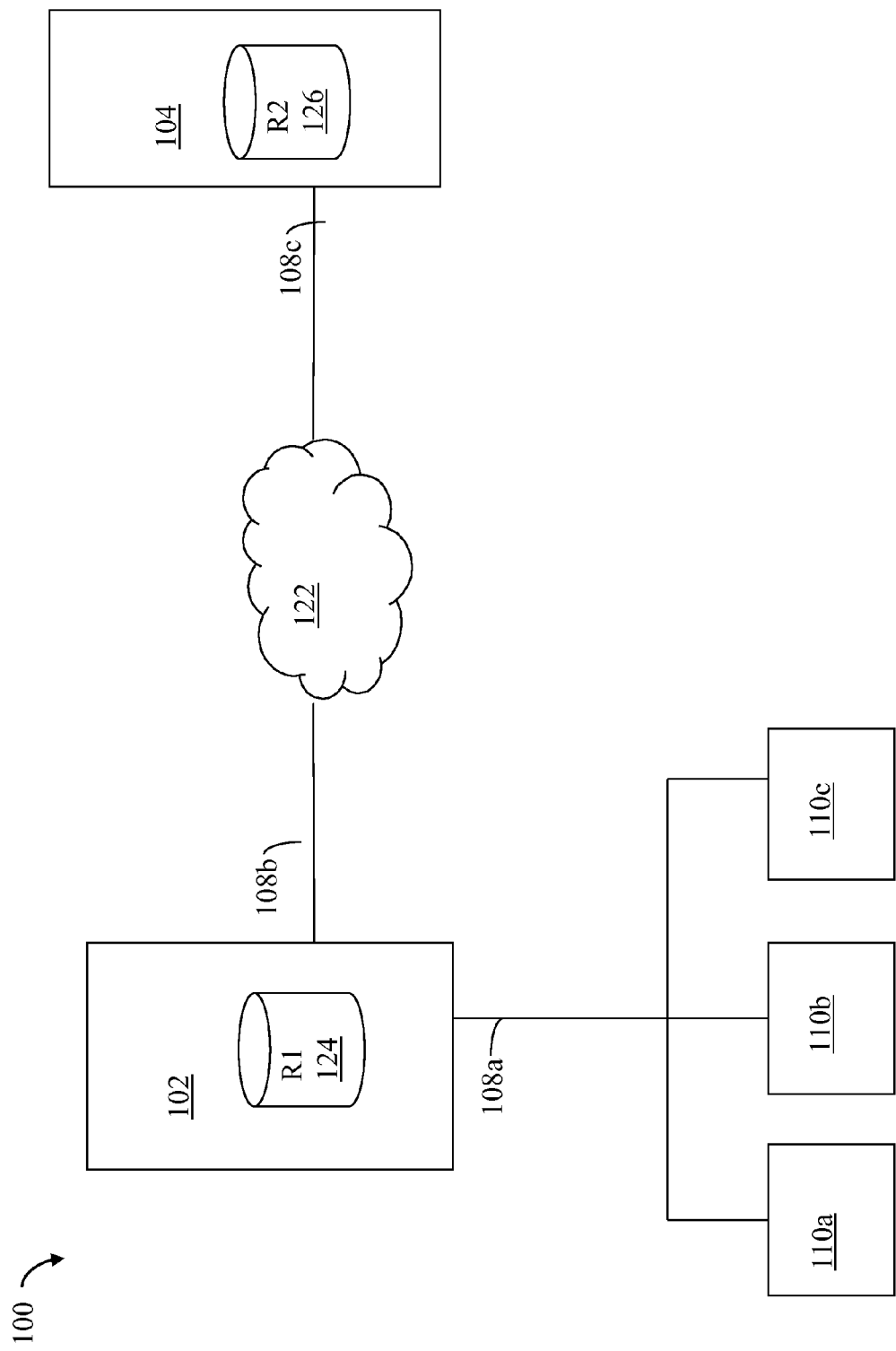
FIGS. 3 and 5 are example representations of components of a system that may be used in connection with the techniques herein.

Referring to FIG. 3, shown is an example of an embodiment of a system 100 that may be used in connection with the techniques described herein. It should be noted that the embodiment illustrated in FIG. 3 presents a simplified view of some of the components illustrated in FIGS. 1 and 2A, for example, including only some detail of the data storage systems 20a through 20n for the sake of illustration.

Included in the system 100 are data storage systems 102 and 104 and hosts 110a, 110b and 110c. The data storage systems 102, 104 may be remotely connected and communicate over network 122, such as the Internet or other private network, and facilitate communications with the components connected thereto. Hosts 110a, 110b and 110c may perform operations to data storage system 102 over connection 108a. The hosts 110a, 110b and 110c may be connected to the data storage system 102 through connection 108a which may be, for example, network or other type of communication connection. Although not illustrated, the hosts 110a-110c may also be directly connected to a network such as the Internet.

The data storage systems 102 and 104 may include one or more devices. In this example, data storage system 102 includes device R1 124 and data storage system 104 includes device R2 126. Both of the data storage systems may include one or more other logical and/or physical devices. Data storage system 102 may be characterized as local with respect to hosts 110a, 110b and 110c. Data storage system 104 may be characterized as remote with respect to hosts 110a, 110b and 110c. For example, in some embodiments in accordance with techniques herein, the distance between the data storage systems 102 and 104 may be 200 km or more.

The host 110a may issue a command, such as to write data to device R1 of data storage system 102. In some instances, it may be desirable to copy data from the storage device R1 to another second storage device, such as R2, provided in a different location so that if a disaster occurs that renders R1 inoperable, the host (or another host) may resume operation using the data of R2. Such a capability is provided, for example, by the SRDF® products provided by EMC Corporation of Hopkinton, Mass. Data storage device communication between Symmetrix™ data storage systems using SRDF® is described, for example, in U.S. Pat. Nos. 5,742, 792 and 5,544,347, both of which are incorporated by reference herein. With SRDF®, a user may denote a first storage device, such as R1, as a master storage device and a second storage device, such as R2, as a slave storage device. Other incarnations of SRDF® may provide a peer to peer relationship between the local and remote storage devices. In this example, the host 110a interacts directly with the device R1 of data storage system 102, but any data changes made are automatically provided to the R2 device of data storage system 104 using SRDF®. In operation, the host 110a may read and write data using the R1 volume in 102, and SRDF® may handle the automatic copying and updating of data from R1 to R2 in data storage system 104.

As illustrated in connection with other figures herein, data storage system 102 may have one or more RAs included therein to facilitate remote connections to the data storage system 104. Communications between storage system 102 and 104 may be made over connections 108b,108c to network 122. Data storage system 104 may include one or more RAs for use in receiving the communications from the data storage system 102. The data storage systems may communicate, for example, over Gigabit Ethernet connections supporting TCP/IP traffic. The SRDF® replication functionality may be facilitated with the RAs provided at each of the data storage systems 102 and 104. Performing remote data communications using SRDF® over a TCP/IP network is described in more detail in U.S. Pat. No. 6,968,369, Nov. 22, 2005, Veprinsky, et al., REMOTE DATA FACILITY OVER AN IP NETWORK, which is incorporated by reference herein. In connection with SRDF®, a single RDF link or path may be between an RA of the system 102 and an RA of the system 104. As described in more detail below, techniques are described for use in controlling the flow or amount of requests over an RDF link, such as I/O traffic in connection with performing remote data replication over the RDF link between the systems 102 and 104.

An embodiment may also include the concept of a remote data facility (RDF) group in which one or more devices on a data storage system are associated with a particular group under the control of a single RA which services the devices included therein. Rather than have a single R1 device and a single R2 device, a grouping may be defined so that a source group of devices, such as on data storage system 102, have corresponding target devices of a target group, such as devices on data storage system 104. Devices in a source group may be mirrored in corresponding devices of a target group using SRDF® functionality.

Techniques herein may be used with SRDF®, or more generally any RDF, operating in one or more different supported modes. For example, such modes may include SRDF® operating in synchronous mode, asynchronous mode, or adaptive copy mode. For example, in connection with SRDF®, the host may issue a write to an R1 device in a first data storage system and the data change is propagated to the R2 device in a second data storage system. As discussed in U.S. Pat. No. 5,544,347, SRDF® can be operated in either a synchronous mode or an asynchronous mode. When operating in the synchronous mode, the host does not consider an operation specified by a command chain to be completed until the command chain has been committed to both the first and second data storage systems. Thus, in synchronous mode, the first or source storage system will not provide an indication to the host that the data operation is complete until the first storage system receives an acknowledgement from the second data storage system regarding the data for the R2 device. In contrast, in connection with the asynchronous mode, the host receives an acknowledgement from the first data storage system as soon as the information is committed to the first data storage system without waiting for an acknowledgement from the second data storage system. With synchronous SRDF®, a host cannot proceed to the next I/O until a synchronous SRDF® I/O has completed.

Depending on the physical distance between the data storage systems 102, 104, it may be desirable to operate in a mode other than synchronous to avoid host timeouts while the host awaits acknowledgement regarding completion of a host I/O. However, it should be noted that the techniques described herein may be used in connection with any mode of SRDF® and such techniques are independent of the particular SRDF® or remote data replication mode. More generally, although techniques herein may be used in connection with SRDF® for remote data replication, the techniques herein may be more generally used in connection with controlling the flow of data operations between the first data storage system to a second data storage system.

Described in following paragraphs are techniques for adaptive and optimized flow control. The techniques attempt to maximize the I/O (input/output) throughput for an I/O device that has an initiator and a target such as between two data storage systems. The techniques may be performed on the requester (or the initiator) side to throttle the I/O request generation in a way to obtain maximum request throughput (e.g., such as I/Os per second or IOPS) with one or more targets. The throttling is adaptive and independent of any user control. The techniques attempt to gauge the best performance level (e.g. such as measured in IOPS) by doing continuous differential tests. In an embodiment, differential levels or trials are assessed by using various values for a threshold number of allowable job resources available on an RA for a particular path or link (e.g. between an initiator and target). The algorithm works with a reference job resource count of R which is the maximum number of jobs that can be used to start I/O transfers at any point (e.g., maximum or threshold number of outstanding I/O requests allowed). The techniques may then test for performance at various values for R such as R+n1, R, and R−n2 (where 'n1' and 'n2' are each a small integer representing a small delta job resource count such as 2). For each of the various values R+n1, R, and R−n2, processing may include obtaining an observed target system response rate which may be characterized as the rate at which the target is completing the initiator's requests for the differential levels R+n1, R, and R−n2. Based on which of the R values level (e.g., one of R+n1, R, and R−n2) the maximum performance is obtained (e.g., performance may be measured in terms of throughput or IOPS), a new or updated reference job level R is selected. The foregoing may be repeated in an ongoing manner in order for the flow control to ramp up and stabilize at the highest performance level. The differential tests (e.g., trials and assessment for different values of R+n1, R, and R−n2) may be performed generally in connection with any application to control the net outflow of data on the link (that connects the initiator and the target). Although particular embodiments and uses are described herein, more generally, techniques herein may be used on any system that has an initiator and target (which are connected through a communication channel). Since a network is used to connect the initiator and target systems, techniques herein may also check for network congestion and take appropriate actions.

Techniques described in following paragraphs attempt to maximize the utilization of network bandwidth between two data storage systems, such as two data storage systems, while also minimizing and efficiently using resources within the data storage systems. Network bandwidth may be characterized as the amount of data that the network can transfer for a given unit of time. For example, network bandwidth may be expressed in terms of bytes per second (e.g., bytes/second).

In following paragraphs, reference may be made to particular embodiments such as, for example with reference to FIG. 3, whereby techniques herein may be used with remote data replication between data storage systems 102 and 104. However, the techniques herein more generally have applicability in connection with controlling the flow of data operations or requests sent from a source to a target location.

An embodiment may use entities referred to herein as jobs to transfer data to a remote site. A job may be characterized as an I/O instance for transferring a unit of data, such as a track-level I/O transfer of data between data storage systems. In one embodiment, a track may be, for example, 64K bytes and a single job may be used in connection with transferring an amount of storage which is equal to or less than one track or other suitable unit of storage as may be included in an embodiment. Each job created to transfer a unit of storage may be associated with executable code that is executed in connection with performing the data transfer. Each job may also be associated with other resources of a data storage system such as a portion of memory including context information used to perform the data transfer. Such context information may include, for example, the location of the data track to be transferred, status flags, port to be used for the transfer, job identifier, and the like.

At any point in time, there may be number of active jobs whereby each active job corresponds to an incomplete or outstanding data transfer. For example, with reference to FIG. 3, if there are 10 active jobs, it means that there are 10 outstanding or incomplete I/Os for data transfers between the two data storage systems 102, 104. Thus, the number of active jobs at any point in time generally uses a set of resources, such as memory, on the data storage systems. In connection with techniques herein, it may be desirable to set a maximum number of active jobs (max jobs) defining an upper bound, threshold or limit of the number of allowable outstanding jobs that may be active at any point in time. For example, such a maximum number or upper bound may be specified per path or link used for I/Os for transfer from an initiator to a target. In following paragraphs, R refers to a reference job resource count which is the upper bound or maximum number of allowable jobs for outstanding or incomplete I/O transfers between the two data storage systems at a point in time. In connection with techniques herein, the foregoing upper bound or maximum number of active jobs, R, may be adjusted or modified to different values at different points in time.

Techniques herein perform processing to calculate values for Rcurr which represents the current value for R at a point in time. Techniques herein may perform assessment periods during which different varying trial values for R may be assessed to determine whether Rcurr should be adjusted and if so, in what direction (e.g., by increasing Rcurr or decreasing Rcurr). An assessment period is a time period during which the flow control techniques perform an assessment of the number of I/Os completed per second (IOPS) for different trial R values. Thus, each assessment period may include multiple trials where each trial is one second (or longer). There may be 3 trials in each assessment period thereby an assessment period may be at least 3 seconds long in one embodiment. Within an assessment, the 3 trials may use different trial values for R which are the same as the current value of Rcurr, greater than Rcurr, and less than Rcurr. Let C (Constant) refer to a trial R value that is the same as Rcurr. Let U (Up) refer to a trial R value that is more than Rcurr and represented as Rcurr+delta1, where delta1 is some integer >0. Let D (Down) refer to a trial R value that is less than Rcurr and represented as Rcurr−delta2, where delta2 is some integer >0.

Figure 3A:
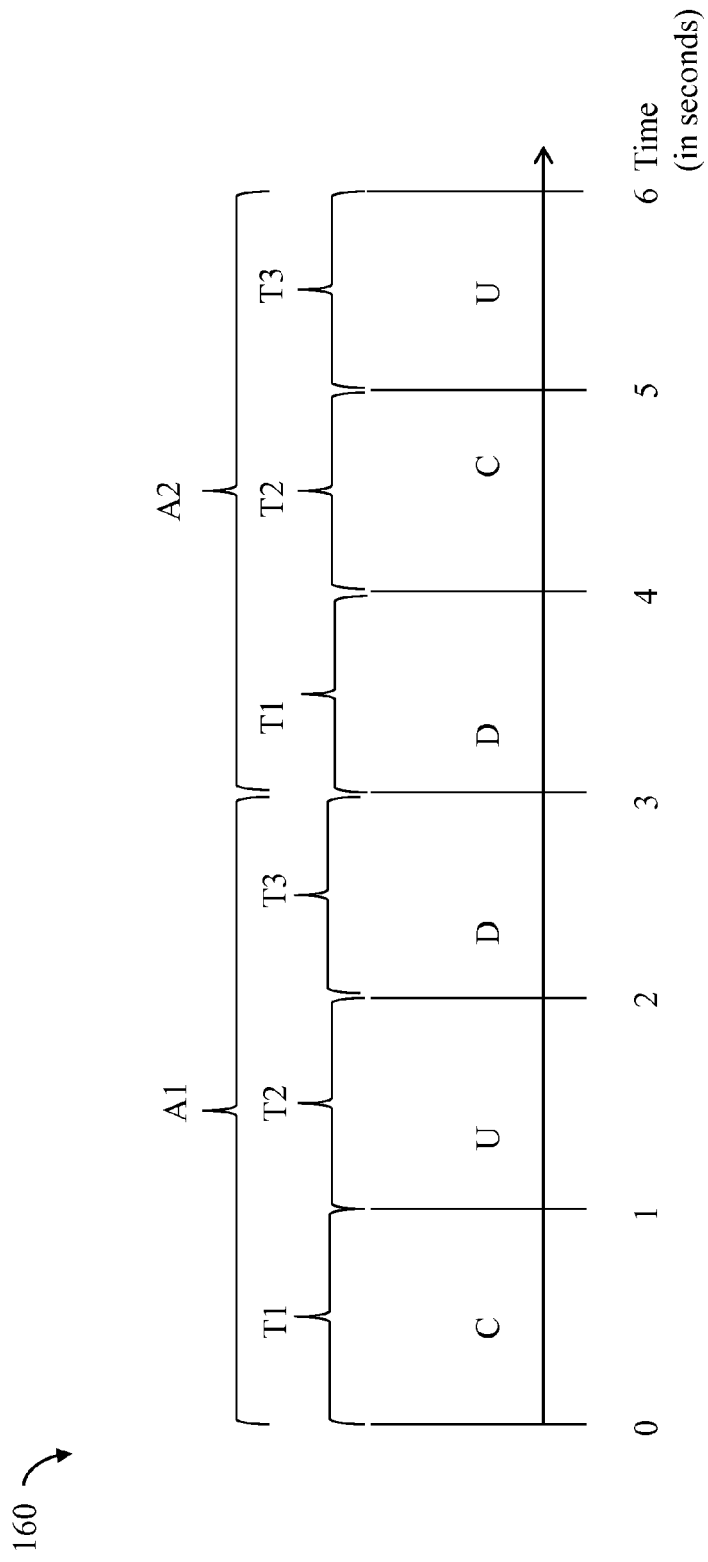
FIG. 3A is an example illustrating trial periods and assessment periods that may be performed in an embodiment in accordance with techniques herein.

Referring to FIG. 3A, shown is an example illustrating assessment periods and trial periods as may be used in an embodiment in connection with techniques herein. The example 160 includes a first assessment period A1 that includes three trial periods denoted T1, T2 and T3, and a second assessment period A2 that includes three trial periods denoted T1, T2 and T3. In this example, the trial period time is 1 second although an embodiment may use other suitable trial time periods consistent with discussion elsewhere herein. Also illustrated in the example 160 are notations of C, U, and D identifying, which of the trial periods in each assessment period, respectively, use corresponding C, U, and D R trial values. As described in more detail below, the order or sequence in which the different C, U and D Rtrial values are used in an assessment period may be randomly determined and vary between assessment periods. It should be noted that although the FIG. 3A illustrates only two assessment periods, an embodiment in accordance with techniques herein may continually perform processing in an ongoing manner with additional successive assessment periods.

Consistent with the above for the first trial T1 of the first assessment period A1, processing for the first trial T1 may commence whereby Rcurr=10 and the number of IOPS that occur during T1 may be observed. Similarly, processing may be performed for T2 and T3 of A1 to determine corresponding performance values in terms of IOPS for the trials periods In this manner, at the end of an assessment period, information observed may be as in TABLE 1 below:

TABLE 1

| Ending Time | Rtrial values | IOPS (I/O rate) |
|---|---|---|
| 1 | 10 (C trial) | X |
| 2 | 12 (U trial) | Y |
| 3 | 8 (D trial) | Z |

At the end of the assessment period A1, the collected or observed data of TABLE 1 may be analyzed to determine how the X Y and Z values are trending with respect to the different corresponding R values. Based on the IOPS obtained for the different R trial values of U, D and C, techniques herein may determine to either not modify or adjust Rcurr, or may otherwise determine to increase or decrease Rcurr. Generally, Rcurr may be updated to a new Rcurr value which, as determined by the trial R values during the assessment period, resulted in the largest or maximum IOPS. For example, with reference to the R trial values in TABLE 1 obtained for a first assessment period A1, assume Z<X<Y. As a result of the assessment period A1, Rcurr may be updated from 10 to 12 since Y is the highest or maximum observed performance in terms of I/O throughput. It should be noted that the updated value of Rcurr determined as a result of the first assessment period A1 may be used as the initial Rcurr value for the subsequent successive assessment period A2. Generally, the updated value of Rcurr determined as a result of the Nth assessment period may be used as the initial Rcurr value for the next subsequent assessment period N+1.

Figure 4:
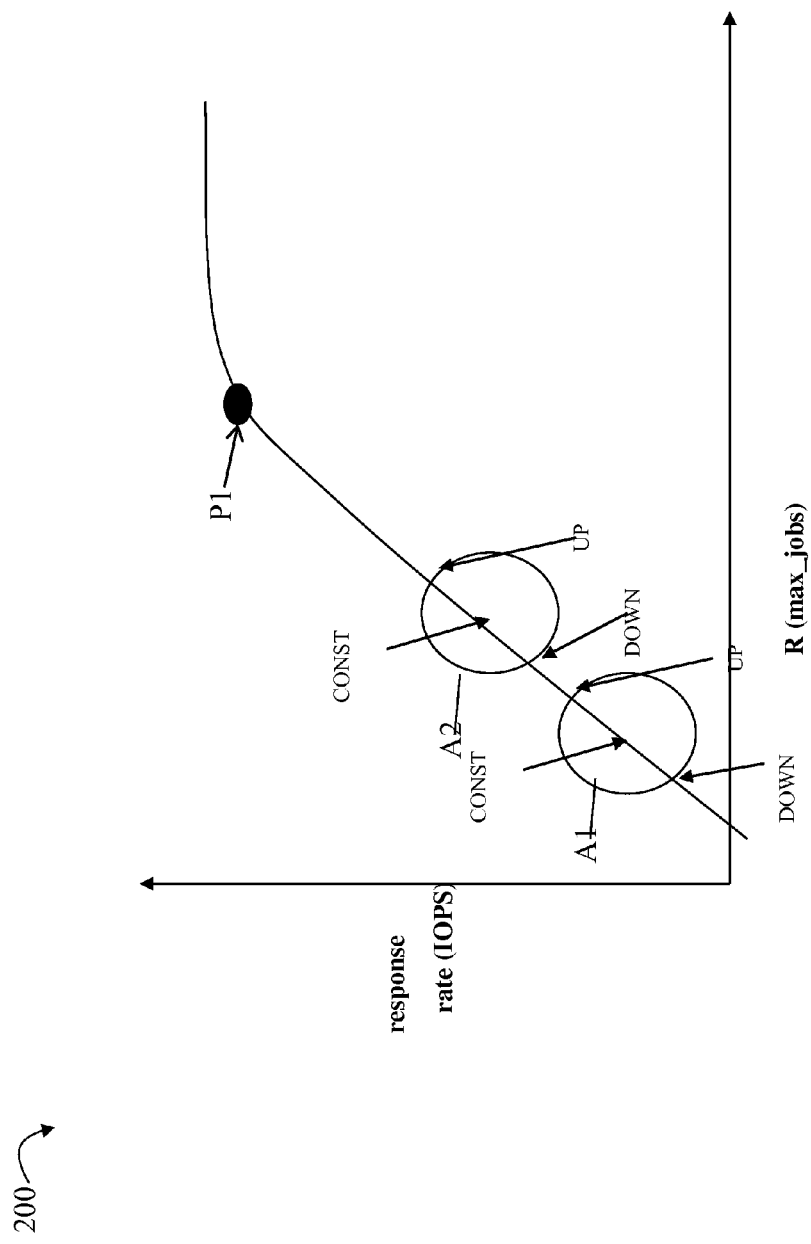
FIG. 4 is a graphical illustration of different R values and associated response rates in terms of I/Os per second with notation regarding R trial values that may be used during different assessment periods in an embodiment in accordance with techniques herein.

With reference to FIG. 4, shown is an example 200 of a curve illustrating a theoretical approximation of the observed IOPS (Y axis) at different R values (X axis). Although the general shape of the curve of the example 200 may be known, the particular coordinates for points on the curve and the value for R at which point P1 occurs are generally unknown and may also change with time as conditions of the network change. In this manner, techniques herein may observe the IOPS obtained for different trial R values to determine whether a particular trial R value is on the upslope of the curve (e.g., trial R value is less than the R value associated with P1) or otherwise not on the upslope (e.g., trial R value more than the R value associated with P1 thereby not showing an increase in IOPS for increases in R). It should be noted that although the curve illustrates an upslope (e.g., whereby IOPS steadily increases as R is increased) followed by a leveling off (e.g., wherein the amount of IOPS may reach an approximately constant value even though R is increased), it may be that the number of IOPs also decreases as R is increased. As will be appreciated by those skilled in the art, the curve of FIG. 4 may be generally characterized as a smoothed theoretical curve fitted from actual observed data points. In this manner, actual observed values may vary from the illustrated smoothed or fitted curve of FIG. 4.

At some point on the curve, such as illustrated by point P1, increasing R does not result in an increased number of observed IOPS. Point P1 may be identified in terms of X and Y coordinates using an R value (as the X coordinate) and an IOPS value (as the Y coordinate). Increasing R beyond the value associated with the point P1 may not result in obtaining an increased in IOPS. By observing the above-mentioned trend for one or more assessment periods of how the number of observed IOPS varies as R is increased and decreased with respect to Rcurr, an embodiment may determine generally where R curr and the different trial R values are located on the curve. For example, assume Z<X<Y for the first assessment period A1 as illustrated in TABLE 1. In a similar manner, assume a next subsequent assessment period A2 results in:

TABLE 2

| Ending Time | R trial values | IOPS (I/O rate) |
|---|---|---|
| 4 | 10 (D trial) | L |
| 5 | 12 (C trial) | M |
| 6 | 14 (U trial) | N | whereby L<M<N for the assessment period A2. In this case, the trend observed for both assessment periods A1 and A2 is that increasing R results in increasing IOPS thereby indicating that the assessment periods A1 and A2 utilized R trial values which are less than the R value associated with point P1 (e.g., still on the upward sloping portion of the curve to the left of P1). For example, it may be that A1 and A2 illustrated in FIG. 4 represent the R trial values utilized for each of the above-mentioned assessment periods. By observing the trend, it may be determined that increasing R results in achieving an increased performance benefit as measured in terms of increasing IOPS. Based on the foregoing Rcurr may be updated from 12 to 14 after assessment period A2. However, at some point, increasing R will reach an R value associated with point P1 whereby there is no benefit or increase in IOPS even though the R value is increased. At this point, Rcurr may not be further modified or adjusted for a trial period since there is no benefit as measured in terms of increased IOPS. Since the conditions of network may change, the curve and this ideal value for Rcurr associated with a point P1 of the curve may also change. In this manner, the techniques herein may constantly perform reassessments in an ongoing manner even though a prior assessment period may have determined not to adjust Rcurr.

As noted above, the R trial value for the U (UP) trial during an assessment period may be expressed as Rcurr+delta1 and the R trial value for the D (Down) trial during an assessment period may be expressed as Rcurr–delta2. Delta1 represents the increase or stepwise increment with respect to Rcurr for the R trial value associated with the U trial. Delta2 represents the decrease or stepwise decrement with respect to Rcurr for the R trial value associated with the D trial. In an embodiment delta1 may the same or different than delta2. Values selected for delta1 and delta2 may vary with the trending and position on the curve. At any point in time, values for delta1 and delta2 may be an integer value in a predefined range denoting all allowable or possible values. The maximum value for R may be 512 thereby meaning that Rcurr may be an integer in the range of 1 . . . 512, inclusively. Trial values for R may be assessed during assessment periods where each trial R value is also some integer value in the foregoing range of 1 ... 512, inclusively. The predefined range of integers of 1 ... 4, inclusively, may define the range of possible values for delta 1 and delta 2. Rather than have the same range of possible values for delta 1 and delta 2, different predefined ranges of possible values may be defined for delta 1 and delta 2 (e.g., a first range of predefined integer values may be used to define allowable values for delta1 and a different second range of predefined integer values may be used to define allowable values for delta2). The foregoing are exemplary values that may be used in an embodiment. An embodiment may also increase delta 1 and/or delta2 depending on the number of iterations or successive assessment periods that have resulted in increasing or decreasing Rcurr each assessment. For example, for assessment periods A1 and A2, delta1 and delta2 may both be 2. After two successive assessment periods of increasing Rcurr as just described above, the algorithm may increase the value of delta1 to 3 thereby increasing the level of aggressiveness and speed at which the assessment progresses or ramps up the curve in an attempt to determine the point P1 at which the optimal performance is achieved. In a similar manner, an embodiment may further increase delta1 to 4, for example, as subsequent $3^{rd}$ and $4^{th}$ successive assessment periods may also result in increasing Rcurr.

Rather than specifying a range of possible values for delta1 and delta 2, an embodiment may use the same single fixed value for both delta1 and delta2 (e.g., value1 is the single integer value and value1=delta1=delta2). More generally, an embodiment may select other suitable values for use in an embodiment than as described herein for purposes of illustration.

Based on the observed IOPS for the different trials C, U and P, an embodiment may also decrease Rcurr. For example, assume Rcurr is 14, and delta1=delta2=2 and the following information of TABLE 3 below is observed for a third assessment period A3:

TABLE 3

| Ending Time | R trial values | IOPS (I/O rate) |
|---|---|---|
| 7 | 12 (D trial) | P |
| 8 | 14 (C trial) | Q |
| 9 | 16 (U trial) | R | whereby P (associated with the D trial) is the maximum or largest IOPS values in TABLE 3 (e.g., P>Q and P>R). As above, Rcurr may be assigned the R trial value associated with the maximum performance in terms of IOPS. In this case, Rcurr may be updated from 14 to 12 (the R trial value associated with the D trial). In a manner similar to that as described above, if trending results in one or more assessment periods in which Rcurr is decreased, the amount of the negative step or integer value used with the D trial delta2, may also be increased. For example, delta2 may be adjusted from −2 to −3.

In one embodiment, the techniques herein may be performed in real-time using data received in connection with host I/Os. In such an embodiment, it may be desirable to have delta1 (e.g., positive Up trial increment) >delta 2 (e.g., the negative Down trial decrement amount). Within an assessment period, the order or sequence in which R trial values associated with the D (Down), U (Up) and C (Constant) trials may be random. In connection with random ordering or sequencing of 3 trials for an assessment period, one of six possible trial sequences may be performed (e.g., one of the following UDC, UCD, CUD, CDU, DUC or DCU).

There may be one of three possible outcomes in connection with an assessment period including D, U and C trials which may be summarized as follows. As a first outcome, the IOPS or performance associated with the U trial may be the maximum of all D, U and C trials. Additionally, the following may be true in connection with the first outcome:

$$IOPS(U) > IOPS(C) > IOPS(D)$$

whereby
  IOPS(U) represents the observed IOPS associated with the U trial for the assessment period;
  IOPS(C) represents the observed IOPS associated with the C trial for the assessment period; and
  OPS(D) represents the observed IOPS associated with the D trial for the assessment period.

As a second outcome, the IOPS or performance associated with the C trial may be the maximum of all D, U and C trials. Additionally, the following may be true in connection with this second outcome:

$$IOPS(C) > IOPS(U) \text{ and } IOPS(C) > IOPS(D).$$

The last or default possible outcome may generally represent all other cases in which the above-mentioned criteria for either the first or second outcomes is not met.

If the result of an assessment period is the first outcome as noted above, Rcurr is adjusted to be Rcurr+delta1 so that if Rcurr is used for the current assessment period N, Rcurr+delta1 becomes the updated Rcurr used in the next assessment period N+1.

If the result of an assessment period is the second outcome as noted above, Rcurr may remain unchanged. As a variation an embodiment may vary the processing performed probabilistically, for example, so that 70% of the time when the second outcome results, Rcurr remains unchanged (e.g., Rcurr as used with the current assessment period is also used in the next assessment period). For the remaining 30% of the time when the second outcome results, Rcurr may be decremented to be Rcurr−delta2 (e.g., if Rcurr is used for the current assessment period N, Rcurr−delta2 becomes the updated Rcurr used in the next assessment period N+1). The foregoing use of probabilistically varying the updated value for Rcurr in connection with the second outcome may be used in connection with modeling to account for other possible conditions generating the observed results.

If the result of an assessment period is the last or default outcome as noted above, Rcurr is decremented to be Rcurr−delta2 (e.g., if Rcurr is used for the current assessment period N, Rcurr−delta2 becomes the updated Rcurr used in the next assessment period N+1). Thus, processing may be performed so that Rcurr is decremented to be Rcurr−delta2 for 30% of the time for the second outcome and also if the default outcome results.

The techniques described herein may be performed per RDF link (e.g., per connection or path) between the first and second data storage systems. In SCSI terms, the techniques herein may be performed for each path between an initiator and a target. With reference back to FIG. 2A, an RDF link may be between two RAs in which a first RA is on the first data storage system serving as the R1 system and a second RA is on the second data storage system service as the R2 system. Code performing techniques herein may be included on the RA of the first data storage system functioning as the initiator.

An embodiment may perform techniques herein on a continual ongoing basis. As a slight variation, an embodiment may optionally choose to introduce a delay before a next assessment period, for example, if the above-mentioned second outcome has resulted for a threshold number of successive assessment periods. For example, if 10 successive assessment periods have resulted in the second outcome noted above, an embodiment may introduce an additional time delay prior to performing a next assessment.

The time period for each trial as described above may be, for example, 1 second thereby causing the total assessment period to be 3 seconds. An embodiment may provide for a configurable trial time period. It may be desirable to select a trial time period based on a maximum response time that is the total amount of time it will take for an I/O to be issued from the first to the second data storage system and for the first data storage system to receive a response regarding completion of the I/O operation. An embodiment may use a trial time period which is a function of the foregoing maximum response time. In this manner, the trial time period may be configurable in accordance with factors such as the physical or geographic distance between the first and second data storage systems.

Some embodiment may include network optimizers, such as WAN (wide area network) optimizers on the path used for communications in accordance with techniques herein between the first and second data storage system. In such cases, an embodiment may detect, or otherwise have knowledge regarding, the presence of WAN optimizers in the path or RDF link used for communications between the first and second data storage systems and may perform a variation of processing from that as described above.

Figure 5:
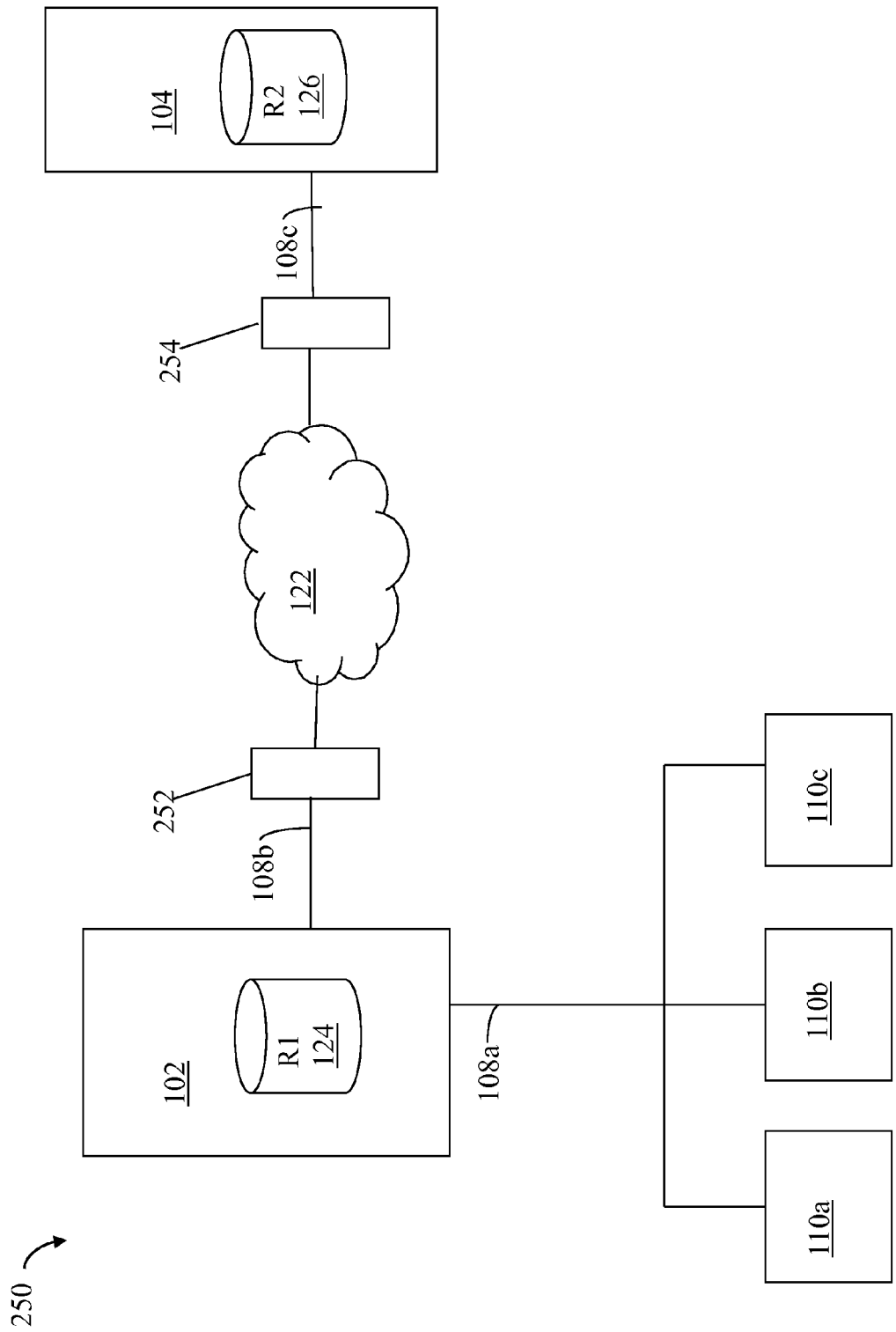

With reference to FIG. 5, shown is an example of an embodiment of a system of FIG. 3 with the addition of elements 252 and 254. Each of the elements 252 and 254 may be an appliance such as a WAN (wide area network) optimizer. The WAN optimizers 252, 254 may each perform one or more optimizations in connection with messaging traffic in the path or RDF link (e.g., through 108b, 122 and 108c) used for communications between the first and second data storage systems in connection with techniques herein. The WAN optimizers 252, 254 may perform optimizations in connection with data transfers between the two data storage systems 102, 104. For example, the optimizations may include compression/decompression, deduplication, and the like. To further illustrate, element 252 may perform compression and 254 may perform the corresponding complementary operation of decompression for a message, such as an I/O operation, sent from 102 to 104 over the path formed by 108b, 122 and 108c. It should be noted that 252 may be located locally or relatively close to 102 and 254 may be located locally or relatively close to 104. When using WAN optimizers, an embodiment may achieve increased performance such as in terms of observed IOPS as described herein (measured at 102 with respect to I/O requests sent to 104) which is due to the WAN optimizer rather than due to variations in the R values evaluated in connection with techniques herein. Thus, an embodiment may optionally detect the presences of the WAN optimizer(s) and perform variations to the above-mentioned description to account for such variations in observed performance that may be due to the WAN optimizer's optimizations.

If a WAN optimizer is detected or is otherwise known to be included in the path or RDF link used in connection with techniques herein, the trial time period may be increased, such as doubled, relative to the trial time period used if there is no WAN optimizer present on the path or RDF link. For example, the trial time period described above is 1 second which may be doubled to 2 seconds if a WAN optimizer (such as 252) is detected. This adjustment may allow for a longer trial period of observed values thereby diluting variations in observed performance for a trial period that may be due to the WAN optimizer's optimizations rather than the variation in R values. Additionally, the range of possible values for delta1 and/or delta2 may also be increased (e.g., maximum value of the range increased) relative to the range used if there is no WAN optimizer present on the path or RDF link. For example, an embodiment may allow possible values for delta 1 to be 1 or 2 (e.g., +1 or +2) when no WAN optimizer is present. If a WAN optimizer is present, the upper bound of the range of possible values for delta 1 may be increased from 2 to 4 so that values for delta 1 may be an integer in the inclusive range 1 . . . 4. Additionally, if a WAN optimizer is present, processing may be performed to test for the presence of an additional outcome and criteria. For example, in an embodiment in which the WAN optimizer is present, processing may be performed to determine whether an outcome of an assessment period matches any of the first and second outcomes noted elsewhere herein. Additionally, an embodiment may perform processing to test whether a third outcome and associated criteria are present which may be represented as:

$$IOPS(U) > IOPS(D) > IOPS(C)$$

If the third outcome results, processing may be performed as described above for the second outcome. If the WAN optimizer is present, the embodiment may also include a last general default case as described above.

Figure 6:
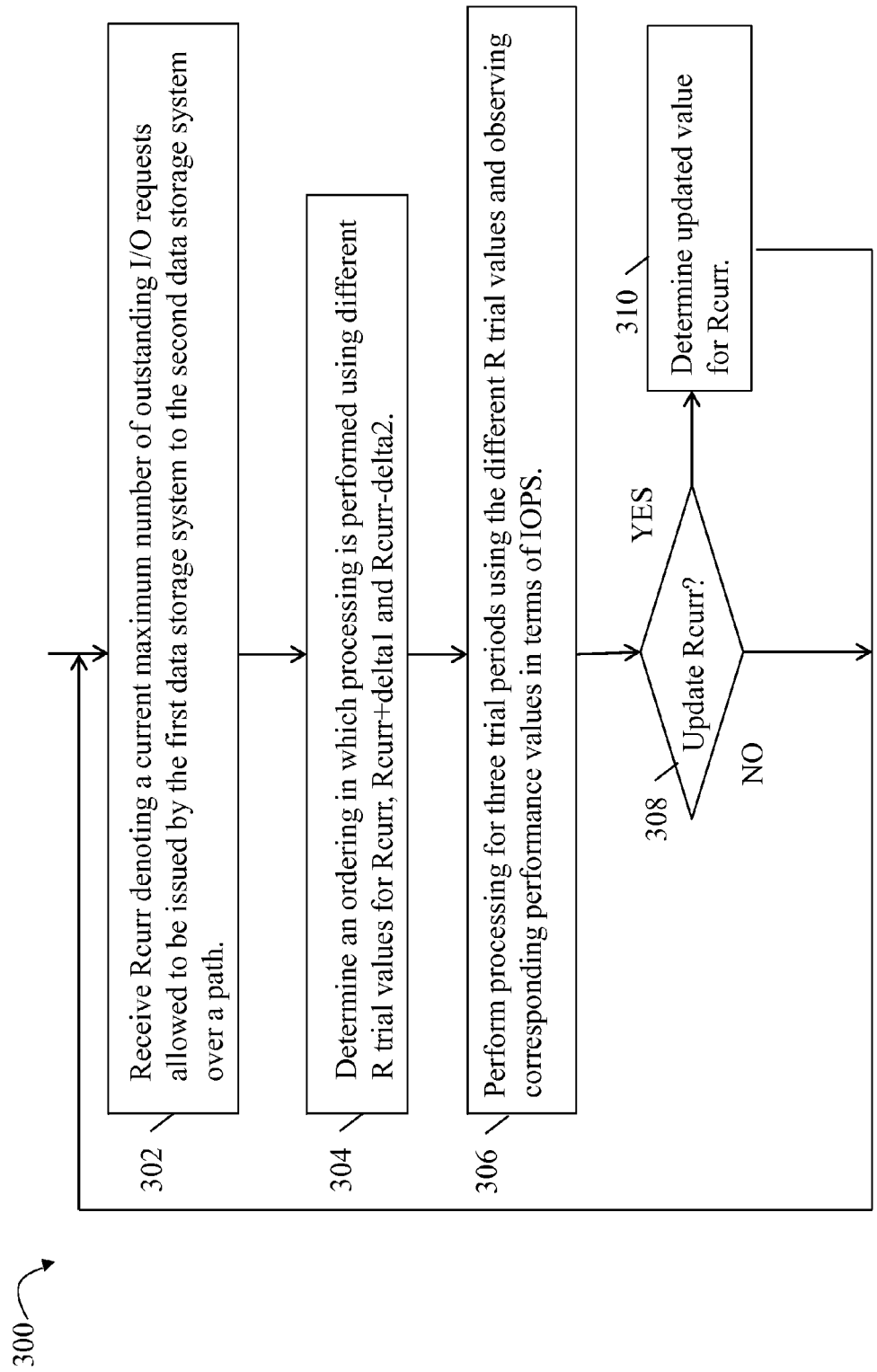
FIG. 6 is a flowchart of processing steps that may be performed in an embodiment in accordance with techniques herein.

Referring to FIG. 6, shown is a flowchart of processing steps that may be performed in an embodiment in accordance with techniques herein. The flowchart 300 generally summarized processing as described above for a single path or RDF link such as between the first and second data storage systems of FIG. 3. In such embodiments, the processing of 300 may be performed by executing code of an RA on the first data storage system. At step 302, Rcurr is received denoting a current maximum number of outstanding I/O requests allowed to be issued by the first data storage system to the second data storage system over the path. It should be noted that an embodiment may use any suitable technique to select an initial value for Rcurr. The processing performed will automatically adjust any initial value as needed although an amount of processing required to tune Rcurr to an optimal, stable value in accordance with techniques herein may vary with the initial value selected for Rcurr in the first assessment period. At step 304, an ordering in which processing is performed using the different R trial values for Rcurr, Rcurr+delta1 and Rcurr–delta2 is determined, such as through random selection. Step 304 determines the order or sequence in which the various U, C and D trials may be performed for a current assessment period using the appropriate R trial values. One iteration of the processing steps of 300 may include steps performed for a single assessment period. At step 306, processing is performed for three trial periods using the different R trial values and observing corresponding performance values in terms of IOPS. At step 308, a determination is made as to whether to update Rcurr. As described above, such a determination may be made in accordance with criteria including the different observed performance values for the different R trial values. If step 308 evaluates to no, control proceeds to step 302 to perform processing for the next assessment period without modifying the value of Rcurr. If step 308 evaluates to yes, control proceeds to step 310 to determine an updated values for Rcurr. As described above, such a determination may be made in accordance with criteria including the different observed performance values for the different R trial values. From step 310, control proceeds to step 302 to perform processing for the next assessment period with the updated value of Rcurr.

Techniques described herein may be characterized as adaptive and optimized flow control techniques providing advantages over other techniques. Generally, the techniques are adaptive to both changing network conditions and target site load. Techniques herein attempt to maximize I/O throughput where, as described elsewhere herein in more detail, the I/O throughput is with respect to the number of initiator sent I/O requests completed by the target. Techniques herein provide for learning the best possible performance level while also minimizing the amount of CPU and memory resources on the initiator and target sites. Techniques herein use a differential test or trial period based on the expected maximum response time of the I/Os sent from the initiator to the target. Thus, techniques herein may be used in connection with both short and long distances between the first and second data storage systems (e.g. initiator and target, respectively). An embodiment may also track, such as through use of a log file, past differential trial tests and their results. Such information may be useful, for example, in analyzing performance issues by looking at the historical trends.

An embodiment may implement the techniques herein using code executed by a processor. For example, an embodiment may implement the techniques herein using code which is executed by a processor of the data storage system, or more generally any other system. As will be appreciated by those skilled in the art, the code may be stored on the data storage system on a computer-readable storage medium (also referred to as a computer readable medium) having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of controlling a flow of I/O requests comprising:
   receiving R denoting a current maximum number of outstanding I/O requests allowed to be issued by a first data storage system to a second data storage system over a path;
   performing assessment processing, said assessment processing including:
      determining a first performance value observed when a maximum number of outstanding I/O requests allowed to be issued by the first data storage system to the second data storage system over the path is R+delta1, wherein delta1 is a positive integer value;
      determining a second performance value observed when a maximum number of outstanding I/O requests allowed to be issued by the first data storage system to the second data storage system over the path is R; and
      determining a third performance value when a maximum number of outstanding I/O requests allowed to be issued by the first data storage system to the second data storage system over the path is R−delta2, wherein delta2 is a positive integer value; and
      determining whether to update R in accordance with criteria including the first performance value, the second performance value and the third performance value, wherein said assessment processing is performed for an assessment period including performing three trial periods, a first of the three trial periods being performed to determine the first performance value, a second of the three trial periods being performed to determine the second performance value, and a third of the three trial periods being performed to determine the third performance value.

2. The method of claim 1, wherein said determining whether to update R includes determining whether the first performance value is greater than both the second and third performance values.

3. The method of claim 2, wherein if the first performance value is greater than both the second and third performance values, an updated value for R is determined as R+delta1.

4. The method of claim 3, wherein said assessment processing is repeated using the updated value for R.

5. The method of claim 2, wherein said determining whether to update R includes determining whether the second performance value is greater than both the first and third performance values.

6. The method of claim 5, wherein if the second performance value is greater than both the first and third performance values, R is not updated.

7. The method of claim 1, wherein an order in which the three trial periods are performed is randomly determined.

8. The method of claim 1, wherein a time period indicating an amount of lapsed time for each of the three trial periods is determined in accordance with a maximum response time representing an aggregated maximum amount of time expected for transmitting an I/O request from the first data storage system to the second data storage system, for performing the I/O request by the second data storage system, and for the first data storage system to receive an acknowledgment regarding completion of the I/O request.

9. The method of claim 8, wherein a network optimizer is included on the path, the network optimizer performing one or more optimizations on messages sent over the path, and wherein any of: the time period for each of the trial periods, the criteria used in determining whether to update R, allowable values for delta1, and allowable values for delta1 are adjusted in response to the network optimizer being included on the path.

10. The method of claim 9, wherein when the network optimizer is included on the path, the time period for each of the three trial periods is increased from a first amount of time to a second amount of time, said first amount of time being an amount of time of the time period when no network optimizer is present on the path.

11. The method of claim 1, wherein allowable values for delta1 are included a first predetermined range of values and allowable values for delta2 are included a second predetermined range of values.

12. The method of claim 11, wherein the first predetermined range and the second predetermined range each represent a same range of integer values.

13. The method of claim 11, wherein said assessment processing is performed a plurality of iterations, wherein a value for R used in one of the plurality of iterations is determined from another of the plurality of iterations performed immediately prior to said one iteration.

14. A method of controlling a flow of I/O requests comprising:
   receiving R denoting a current maximum number of outstanding I/O requests allowed to be issued by a first data storage system to a second data storage system over a path;
   performing assessment processing, said assessment processing including:
      determining a first performance value observed when a maximum number of outstanding I/O requests allowed to be issued by the first data storage system to the second data storage system over the path is R+delta1, wherein delta1 is a positive integer value;
      determining a second performance value observed when a maximum number of outstanding I/O requests allowed to be issued by the first data storage system to the second data storage system over the path is R; and
      determining a third performance value when a maximum number of outstanding I/O requests allowed to be issued by the first data storage system to the second data storage system over the path is R−delta2, wherein delta2 is a positive integer value; and
      determining whether to update R in accordance with criteria including the first performance value, the second performance value and the third performance value, wherein said determining whether to update R includes determining whether the first performance value is greater than both the second and third performance values, and wherein said determining whether to update R includes determining whether the second performance value is greater than both the first and third performance values, and wherein if the second performance value is greater than both the first and third performance values, R is not updated a first percentage of time and wherein for a second percentage of time, an updated value for R is determined as R−delta2.

15. The method of claim 14, wherein the first percentage of time is 70% and wherein the second percentage of time is 30%.

16. A method of controlling a flow of I/O requests comprising:
   receiving R denoting a current maximum number of outstanding I/O requests allowed to be issued by a first data storage system to a second data storage system over a path;
   performing assessment processing, said assessment processing including:
      determining a first performance value observed when a maximum number of outstanding I/O requests allowed to be issued by the first data storage system to the second data storage system over the path is R+delta1, wherein delta1 is a positive integer value;
      determining a second performance value observed when a maximum number of outstanding I/O requests allowed to be issued by the first data storage system to the second data storage system over the path is R; and
      determining a third performance value when a maximum number of outstanding I/O requests allowed to be issued by the first data storage system to the second data storage system over the path is R−delta2, wherein delta2 is a positive integer value; and
      determining whether to update R in accordance with criteria including the first performance value, the second performance value and the third performance value, wherein said determining whether to update R includes determining whether the first performance value is greater than both the second and third performance values, and wherein said determining whether to update R includes determining whether the second performance value is greater than both the first and third performance values, and wherein if the first performance value is not greater than both the second and third performance values, and wherein if the second performance value is not greater than both the first and third performance values, an updated value for R is determined as R−delta2.

17. The method of claim 16, wherein said assessment processing is repeated using the updated value for R.

18. A system comprising:
   a first data storage system and a second data storage system, wherein a plurality of paths are used in connection with issuing I/O requests from the first data storage system to the second data storage system;
   a first plurality of remote adapters of the first data storage system;
   a second plurality of remote adapters of the second data storage system, each of the plurality of paths including an initiator port of one of the first plurality of remote adapters of the first data storage system issuing one of the I/O requests to a target port of one of the second plurality of remote adapters of the second data storage system; and wherein
   each of the first plurality of remote adapters of the first data storage system comprises code stored on a computer readable medium which, when executed by a processor, performs processing comprising:
      receiving R denoting a current maximum number of outstanding I/O requests allowed to be issued by the first data storage system to the second data storage system over one of the plurality of paths including said each remote adapter;
      performing assessment processing, said assessment processing including:
         determining a first performance value observed when a maximum number of outstanding I/O requests allowed to be issued by the first data storage system to the second data storage system over the one path is R+delta1, wherein delta1 is a positive integer value;
         determining a second performance value observed when a maximum number of outstanding I/O requests allowed to be issued by the first data storage system to the second data storage system over the one path is R; and
         determining a third performance value when a maximum number of outstanding I/O requests allowed to be issued by the first data storage system to the second data storage system over the one path is R−delta2, wherein delta2 is a positive integer value; and
      determining whether to update R in accordance with criteria including the first performance value, the second performance value and the third performance value, wherein said assessment processing is performed for an assessment period including performing three trial periods, a first of the three trial periods being performed to determine the first performance value, a second of the three trial periods being performed to determine the second performance value, and a third of the three trial periods being performed to determine the third performance value.

19. A non-transitory computer readable medium comprising code stored thereon for controlling a flow of I/O requests, the non-transitory computer readable medium comprising code stored thereon that, when executed, performs a method comprising:
  receiving R denoting a current maximum number of outstanding I/O requests allowed to be issued by a first data storage system to a second data storage system over a path;
  performing assessment processing, said assessment processing including:
    determining a first performance value observed when a maximum number of outstanding I/O requests allowed to be issued by the first data storage system to the second data storage system over the path is R+delta1, wherein delta1 is a positive integer value;
    determining a second performance value observed when a maximum number of outstanding I/O requests allowed to be issued by the first data storage system to the second data storage system over the path is R; and
    determining a third performance value when a maximum number of outstanding I/O requests allowed to be issued by the first data storage system to the second data storage system over the path is R−delta2, wherein delta2 is a positive integer value; and
  determining whether to update R in accordance with criteria including the first performance value, the second performance value and the third performance value, wherein said assessment processing is performed for an assessment period including performing three trial periods, a first of the three trial periods being performed to determine the first performance value, a second of the three trial periods being performed to determine the second performance value, and a third of the three trial periods being performed to determine the third performance value.

* * * * *